United States Patent Office 3,033,861
Patented May 8, 1962

3,033,861
11,18-EPOXY-20-DIALKYLAMINO STEROIDS
James F. Kerwin, Broomall, and Manfred E. Wolff, Elkins Park, Pa., assignors to Smith Kline & French Laboratories, Philadelphia, Pa., a corporation of Pennsylvania
No Drawing. Filed July 22, 1960, Ser. No. 44,538
8 Claims. (Cl. 260—239.55)

This invention relates to 11,18-epoxy-20-dialkylamino steroids and to processes for preparing them and converting them to intermediates useful in the preparation of therapeutic compounds. The novel steroids of this invention more specifically have a pregnane or allopregnane skeleton.

These 11,18-epoxy-20-dialkylamino steroids are useful intermediates in the preparation of other steroid derivatives which have valuable therapeutic activity such as aldosterone or diuretic activity by methods which will be described hereafter.

The novel compounds and processes of this invention are illustrated by the following:

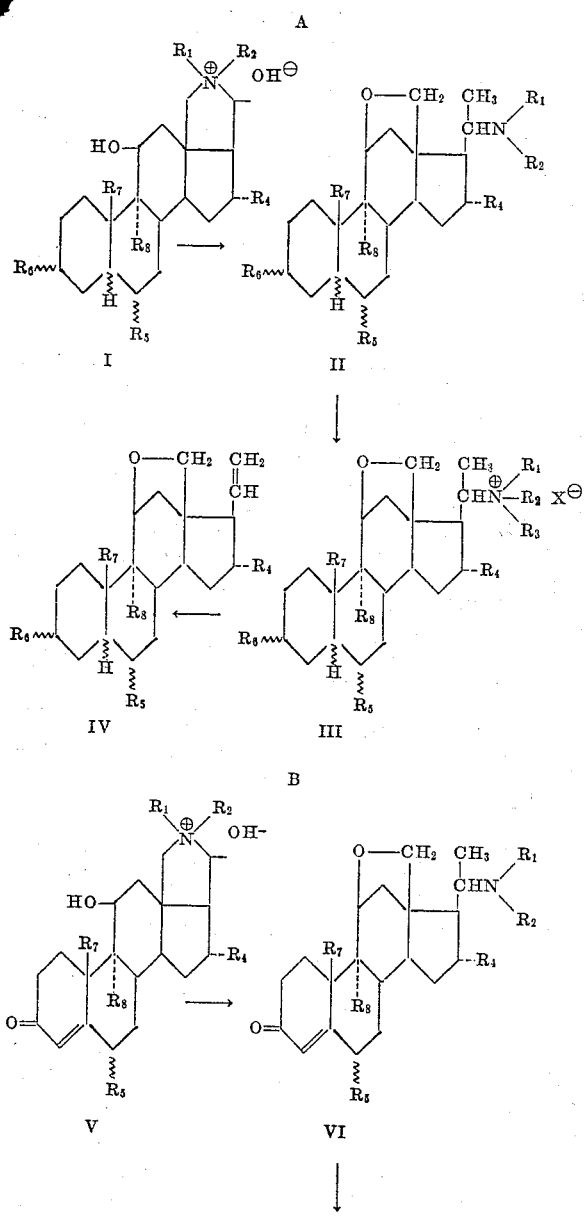

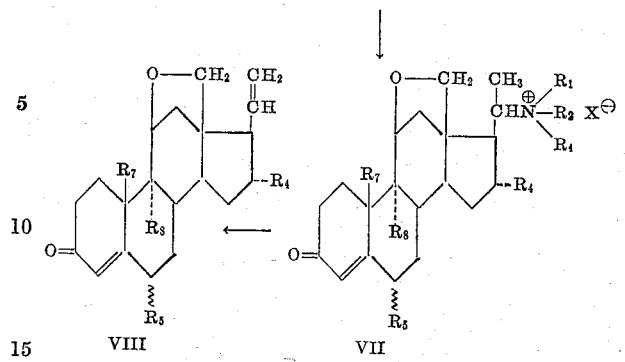

in which:
$R_1$, $R_2$ and $R_3$ are lower alkyl having 1–4 carbon atoms inclusive, preferably methyl;
$R_4$ is hydrogen or methyl, preferably hydrogen;
$R_5$ is hydrogen, fluoro or methyl, preferably $\alpha$;
$R_6$ is hydroxy, acetoxy or, taken together with the carbon atom to which it is attached, keto;
$R_7$ is hydrogen or methyl, preferably methyl;
$R_8$ is hydrogen or fluoro;
⁞ is either $\alpha$ or $\beta$; and
X is an anion, preferably an inorganic anion, such as halide, for instance, iodide, chloride or bromide, methosulfate, sulfate or p-toluene sulfonate, which forms a stable quaternary salt.

Advantageously, $R_1$, $R_2$, and $R_3$ are methyl;
$R_4$ is hydrogen or methyl;
$R_5$ is hydrogen, $\alpha$-fluoro or $\alpha$-methyl;
$R_6$ is hydroxyl;
$R_7$ is methyl;
$R_8$ is hydrogen or fluoro;
⁞ is either $\alpha$ or $\beta$; and
X is a reactive halide of a minimum atomic weight of 35, preferably iodide.

The starting material for the preparation of the novel 11,18-epoxy-20-dialkylamino steroids of this invention are the quaternary hydroxide derivatives of the properly substituted conanines as represented by Formulas I and V above. These compounds and their preparations are described in our copending applications, Serial No. 832,165 now Patent No. 3,004,965, Serial No. 23,631 now Patent No. 9,989,526, and Serial No. 1,450 now Patent No. 3,006,915. Briefly, however, these compounds are prepared from 20-keto steroids with free $C_{18}$ groups having any desired configuration or substitution in the steroidal nucleus. These 20-keto compounds are reacted with an excess of a primary lower alkylamine under mild hydrogenation conditions using platinum oxide catalyst. The resulting 20-monoalkylamine is treated with a halogenating agent such as N-chlorosuccinimide or sodium hypochlorite solution, to give the 20-(N-haloamine) which is, in turn, irradiated with ultraviolet light in the presence of trifluoroacetic acid to give the conanine base of the desired starting material. The desired 11$\beta$-hydroxylated derivatives of the conanines are easily prepared by reducing their 11-keto congeners with lithium aluminum hydride in ethereal solvent such as tetrahydrofuran.

The N-alkyl-11$\beta$-hydroxy-conanine is converted into a quaternary derivative, usually with a reactive alkyl halide, such as a lower alkyl iodide, preferably methyl iodide. This quaternary salt is then converted to the quaternary ammonium hydroxide by exchanging the anion or halide portion with the hydroxyl form of an anion exchange resin prepared by passing 10% sodium hydroxide over the quaternary halide until all the halide ion is exhausted.

More specifically, the quaternary halide conanine, dissolved in an organic solvent in which it is soluble and nonreactive, such as the preferred lower alkyl alcohols, for instance methanol or ethanol, is reacted with an excess of the hydroxide form of an anion exchange resin. Exemplary of the resins (halide form) which can be used are the preferred Amberlite IRA–400, as well as Amberlite IRA–401, Amberlite IRA–410, Amberlite IRA–411, Dowex 1, Dowex 2, Imac S–3 and others. Full descriptions of these resins including what is known of their sources and chemical charcateristics are found in "Ion Exchange Resins" by Kunin, 2nd edition, John Wiley, pages 89–96 and "Ion Exchangers in Organic and biochemistry" by Calmon and Kressman, Interscience, pages 116–129. Exemplary of the preparation of the anion exchange resins used are those disclosed by U.S. Patents No. 2,591,573, No. 2,689,833, No. 2,689,832 and No. 2,725,361, particularly those of the example of No. 2,591,573 and Example 1 of No. 2,689,833.

According to the process of this invention, the quarternary hydroxide conanine starting materials prepared as described above are heated, preferably under vacuum until the effervescence ceases. The heating period is carried out advantageously at from about 150–250° C. at low vacuum, such as from about 5–200 mm. pressure. Preferred conditions are at about 180° C. under about 10–50 mm. pressure. The reaction time is usually about 2—3 minutes to 4 hours, preferably about 10—60 minutes. The residue is recrystallized from a suitable solvent such as a lower alkyl alcohol, for example ethanol, isopropanol or, preferably, methanol to give the novel 11,18-epoxy-20-dialkylamino steroids.

The residue yielded upon evaporation of the alcoholic filtrate obtained above is treated with an excess of a reactive quaternizing agent under the reaction conditions described above. The mixture is filtered and the filtrate evaporated to give an 18 - dialkylamino - $\Delta^{20}$ - steroid. These steroids are claimed in our copending application, Serial No. 832,165.

The 11,18-epoxy-20-dialkylamino steroid obtained above is reacted with an excess of a reactive quaternizing agent such as a $C_1$–$C_4$ alkyl halide, for instance iodide, chloride or bromide, methosulfate, sulfate or p-toluene sulfonate, preferably methyl iodide in an organic solvent in which the reactants are substantially soluble and nonreactive such as benzene, toluene or acetonitrile at temperatures from about 60–120° C., preferably at the reflux temperature of the solvent for about 1–3 hours. The product which is isolated by filtration is the lower alkyl quaternary ammonium salt of the 11,18-epoxy-20-dialkylamino steroid.

The quaternary salt prepared as described above is converted to an 11,18-epoxy-20-pregnene by reacting with an excess of an alkaline reagent in a polar organic solvent, preferably anhydrous, in which the reactants are substantially soluble as well as with which the reactants are nonreactive and which additionally is a strongly ionizing solvent such as the simple liquid formamides and acetamides as well as their N-lower alkyl derivatives having one or two N-alkyl substituents of from 1 to 4 carbon atoms, acetonitrile or a lower alkyl alcohol such as methanol or ethanol. The preferred solvents are anhydrous N,N-dimethylformamide and N,N-dimethylacetamide.

As the alkaline reagent there is used, an inorganic strongly basic reagent such as an alkali metal lower alkoxide of up to 6 carbon atoms especially sodium methoxide, sodium ethoxide, sodium t-butoxide or their potassium analogs; the alkali metal amides especially sodium amide, lithium amide or potassium amide; the alkali metal hydrides especially lithium hydride or sodium hydride or the alkali metal hydroxides such as sodium or potassium hydroxide. The alkoxides are preferred. Usually an excess of the alkali is used, however the proportion of reactants can vary widely.

The reaction is run at temperatures of from about 50–250° C. preferably from about 75–175° C. but of course not exceeding the boiling point of the solvent. The reaction proceeds rapidly often being essentially complete within about 2–3 hours. Usually the reaction time is from about 5–60 minutes.

The novel process of this invention is independent of configuration and substituents other than at the 11,18 and 20 positions, particularly in the A and B rings of the steroid nucleus. Therefore any substituents stable under the alkaline conditions of the reactions can be optionally present. Starting materials having a 3-acyloxy ($R_6$) moiety can be used but usually are hydrolyzed to the 3-hydroxy congener during the rearrangement.

The 11,18-epoxy-20-pregnenes are converted to diacylated 11,18-epoxy-pregnan-20,21-diols which are useful anti-aldosterone and diuretic agents and are also useful as intermediates for the prepartion of other aldosterone antagonists having diuretic activity by the methods described in our copending application, Serial No. 842,615. Briefly, the 11,18-epoxy-$\Delta^{20}$-steroids, if not already 3-keto compounds, are oxidized with chromic acid in neutral acidic or basic solution to give the 3-keto analog. The compounds are then oxidized at the 20,21-positions, preferably with osmium tetroxide. The resulting 20,21-diols are acylated with an excess of an alkanoyl halide or anhydride to give the therapeutically useful 11,18-epoxy-20,21-diacetoxypregnan-3-ones.

In the above description the terms "pregnane" and "pregnene" are used generically to include the corresponding allo or 19-norpregnane structures as well as the normal series. The term "conanine" is used to define steroidal compounds which are pyrrolidine derivatives closed at the 18,20-positions having 20α or 20β as well as 5α or 5β configurations. "Alkali metal" means any member of the metallic group usually included in this classification according to definition but with sodium and potassium preferred.

The definitions described herebefore have been limited for purposes of simplification for instance the acyl group in the definition of $R_6$ is described as acetoxy but a wide range of acyl groups could be substituted therefor. The halogen substituents in $R_5$ and $R_8$ are defined as "fluoro" but bromo and chloro atoms could be substituted therefor. Also the substituents at position 6 could be β as well as α to the ring. The 6 β-substituents are isomerized to the 6α-position by exposure to base or acid.

For the purpose of simplification, the disclosure has been limited to the basic reactions and compounds necessary to practice this invention. Other specific details obvious to one skilled in the art will be even more readily apparent from the following examples. Of course variations and different sequences of reaction will be apparent to one skilled in the art and the overall basic reaction sequences described are only exemplary. All isomers not specifically mentioned but covered in the general structural formulas and names are meant to be included in this invention.

*Example 1*

A solution of 25 g. of 3β-acetoxy-11-keto-conanine (Serial No. 832,165) in 300 ml. of tetrahydrofuran is added dropwise to a stirred solution of 11.6 g. of lithium aluminum hydride in 300 ml. of refluxing tetrahydrofuran. The mixture is stirred at reflux for one hour. After quenching with 46.4 ml. of water, the separated material is removed by filtration. The filtrate is concentrated to dryness on a rotating evaporator to leave a green oil. After dissolving the oil in 50 ml. of methanol and water is added, the crystalline solvate, 3β,11β-dihydroxyconanine, is obtained, M.P. 100–104° C.

A mixture of 18.5 g. of the dihydroxyconanine, 25.3 ml. of methyl iodide and 108 ml. of benzene is heated at reflux for two hours. An off-white crystalline precipitate forms. The mixture is diluted with ether and filtered.

The filter cake is recrystallized from methanol to give 3β,11β-dihydroxyconanine methiodide, M.P. 277–279° C.

A solution of 82 g. of the methiodide in 350 ml. of methanol is passed through a column containing 251 g. of IRA–400 resin (hydroxide form, copending application Serial No. 832,165). The methanolic eluate is evaporated under reduced pressure. The oily residue is heated to 170° C. and maintained there for 15 minutes. The residue is recrystallized from methanol to give 11,18-epoxy-20-dimethylaminoallopregnan-3β-ol, M.P. 177–180° C., [α]$_D$+74°. This product (66.6 g.) is refluxed in benzene for two hours with 142 g. of methyl iodide. Filtration gives the solid product 11,18-epoxy-20-dimethyl-aminoallopregnan-3β-ol methiodide, M.P. 260° C.

Evaporation of the methanolic filtrate from the above described recrystallization gives 18-dimethylamino-20-allopregnen-3β,11β-diol as the residue. Recrystallization from acetone gives colorless needles, M.P. 184–186°, [α]$_D^{25}$=−3°.

A solution of 10 g. of 11,18-epoxy-30-dimethylamino-allopregnan-3β-ol methiodide in 100 ml. of dimethylformamide is treated with 10 g. of sodium methoxide and gently heated to reflux over an open flame. After 10 minutes, the reaction mixture is heated on a steam cone for 30 minutes, poured into 100 ml. of water, chilled and filtered. Recrystallization of the resulting solid from 70% methanol gives 11,18-epoxy-20-allopregnen-3β-ol, M.P. 144–145° C. Reaction of the 3β-ol (500 mg.) with an excess of acetic anhydride in pyridine with warming then quenching in water gives the acetate derivative.

The epoxy compound (330 mg.) in 5 ml. of acetone is treated with 0.28 ml. of 4 M chromic acid solution. The mixture is quenched in 50 ml. of water and several ml. of ethanol then chilled to give white crystals of 11,18-epoxy-20-allopregnene-3-one, M.P. 169–171° C.

A mixture of 3.6 g. of the epoxyallopregnenone, 3 g. of osmium tetroxide and 200 ml. of absolute ether is reacted for 48 hours. The black osmium ester is suspended in 300 ml. of 60% aqueous ethanol containing 24 g. of sodium sulfite, refluxed for 4 hours and filtered. The filtrate is evaporated and the residue stirred with methylene chloride. The extract is washed with water, dried and evaporated to give, after recrystallization from ethyl acetate, 11,18-epoxyallopregnan-20,21-diol-3-one, M.P. 212–215° C.

A solution of 920 mg. of the diol, 2 ml. of acetic anhydride and 2 ml. of pyridine is heated at 90° C. for 30 minutes. The solution is quenched in water, filtered and the resulting solid recrystallized from methanol to give the diacetate, M.P. 155° C.

*Example 2*

A solution of 0.2 mole of 6β,9α-difluoro-4-pregnen-3,11,20-trione (U.S. Patent No. 2,880,205) in 750 ml. of methanol with 2 g. of 5% palladium-on-charcoal is hydrogenated at low pressure and ambient temperature until one molar equivalent of hydrogen is absorbed. The catalyst is removed and solvent evaporated to give 6β,9α-difluoro-allopregnan-3,11,20-trione. This compound (0.17 mole) in 4.5 l. of methanol is mixed over a period of 10 minutes with a mixture of 1.5 l. of methanol, 50 ml. of 2.5 N sodium hydroxide solution and 1.8 l. of 0.18 molar sodium borohydride in pyridine. The mixture is diluted with an excess of concentrated hydrochloric acid then extracted into ether. The ether extracts are washed, dried and evaporated to leave 6β,9α-difluoroallopregnan-3β-ol-11,20-dione. The dione is acetylated with an excess of acetic anhydride in pyridine at 25° C. for 6 hours. A suspension of 20 g. of the acetate compound in 450 ml. of ethanol containing about 15 g. of methylamine is hydrogenated with platinum oxide catalyst to give 6β,9α-difluoro-20-methylaminoallopregnan-3β-ol-11-one acetate. This compound (12 g.) in chloroform is reacted with 500 ml. of 5% sodium hypochlorite solution to give the chloroamine which irradiated in trifluoroacetic acid, then refluxed for 6 hours with 25% methanolic potassium hydroxide to give 6β,9α-difluoro-3β-ol-11-keto conanine. This compound (5 g.) is reduced with lithium aluminum hydride in tetrahydrofuran as in Example 1 to the 11β-hydroxyconanine.

A mixture of 6 g. of the conanine and 7 ml. of methyl iodide in benzene is refluxed for two hours to give the methiodide which is exchanged over a hydroxide anion exchange column as described before to give the quaternary hydroxide. This compound is heated to 170° C. under 10 mm. pressure to give 11,18-epoxy-6β,9α-difluoro-20-dimethylaminoallopregnan-3β-ol which is quaternized with methyl iodide in benzene to give the methiodide.

A mixture of 7 g. of the methiodide in 75 ml. of dimethylformamide with 5 g. of sodium methoxide is heated gently with a flame for 5 minutes, then on the steam bath for 30 minutes. Quenching gives the desired 11,18-epoxy-6β,9α-difluoro-20-allopregnen-3β-ol. The epoxy compound (5 g.) is oxidized with chromic acid in acetone solution to give the 3-one which (4 g.) is oxidized with 3 g. of osmium tetroxide in 350 ml. of ether at 50° C. The osmium ester is decomposed with 400 ml. of sodium sulfite solution at reflux. After methylene chloride extraction of the residue, the desired 11,18-epoxy-6β,9α-difluoro-allopregnan-20,21-diol-3-one is obtained. This diol residue is treated with an excess of acetic anhydride in pyridine to give the corresponding 20,21-diactoxy compound.

*Example 3*

A solution of 20 g. of 19-nor-4-pregnen-3,11β-diol-20-one (U.S. Patent No. 2,878,267) in 250 ml. of methanol with 2 g. of 5% palladium-on-charcoal is hydrogenated at low pressure and room temperature until one mole equivalent of hydrogen is absorbed. The catalyst is removed and the filtrate evaporated to give 19-norallopregnan-3β,11β-diol-20-one [alternatively prepared by the two stage reduction procedure of Example 2 of the known 11β-19-norprogesterone described by Bowers et al., Tetrahedron, 2:165 (1958)] which is converted to the 3-acetate by treatment with one mole of acetic anhydride in pyridine. This compound (18 g.) is taken up in 250 ml. of ethanol containing 15 g. of butylamine and allowed to stand for five hours. The clear solution is shaken with 1 g. of platinum oxide catalyst at 50 p.s.i. of hydrogen. When one mole equivalent of hydrogen is absorbed, the catalyst and alcohol are removed. The residue is taken through acid-ether treatment. The acid extracts are neutralized and extracted with ether. The ether extracts are washed with salt solution, dried and evaporated to yield the acetate of 19-nor-20-butylaminopregnan-3β,11β-diol. A mixture of 15 g. of the secondary amine in acetic acid is reacted slowly with chromic acid in acetic acid solution. The mixture is quenched in water to give the dione. This 11-keto compound (6 g.) in 350 ml. of chloroform is stirred with 350 ml. of 5% sodium hypochlorite solution for two hours. The chloroform layer is removed and worked up to give the N-chloroamine. A solution of 7 g. of the N-chloroamine in 75 ml. of trifluoroacetic acid is irradiated for 60 minutes. The solvent is evaporated to leave the crude 18-chloro compound which is taken up in 100 ml. of methanol and made strongly basic with 25% methanolic potassium hydroxide. After a reflux period of 8 hours, the mixture is evaporated, poured into water and taken through chloroform to give the crude N-butyl-19-nor-3-hydroxy-11-ketoconanine. This compound (2.5 g.) is reduced with an excess of lithium aluminum hydride in tetrahydrofuran as in Example 1 to give the 11β-hydroxyconanine.

A mixture of 5 g. of the conanine and 7 ml. of butyl iodide in benzene is refluxed for 6 hours to give the quaternary salt which is taken up in methanol and passed over a hydroxide resin as described above to give the quaternary hydroxide. The hydroxide is heated at 185°

C. under 15 mm. pressure until effervescence stops to form 20-dibutylamino-11,18-epoxy-19-nor-allopregnan-3β-ol. This compound (5 g.) is reacted with 5 g. of ethyl bromide in toluene to form the quaternary ethobromide.

The ethobromide (5 g.) in 50 ml. of dimethylformamide with 5 g. of potassium methoxide is heated gently with a flame shortly and then on the steam bath for two hours. The mixture is quenched to separate 11,18-epoxy-19-nor-20-allopregnen-3β-ol.

The epoxy compound (4 g.) in 100 ml. of acetone is treated with 3.5 ml. of 4 M chromic acid solution. Quenching gives 11,18-epoxy-19-nor-20-allopregnen-3-one. This compound (3.5 g.), 3 g. of osmium tetroxide and 250 ml. of absolute ether is reacted for 36 hours. The ester is refluxed in 350 ml. of sodium sulfite solution for 5 hours. The reaction filtrate is evaporated and the residue extracted into methylene chloride to yield 11,18 - epoxy - 19 - norallopregnan - 20,21 - diol - 3 - one. The diol (2 g.) is acetylated with 5 ml. of acetic anhydride in 10 ml. of pyridine to give 11,18-epoxy-20,21-diacetoxy-19-norallopregnan-3-one.

*Example 4*

A mixture of 4 g. of lithium aluminum hydride, 8 g. of 3β-hydroxy-6α-fluoro-11-ketoconanine (prepared by reduction of the known 11-keto-6α-fluoroprogesterone with palladium-on-charcoal and then sodium borohydride to 6α-fluoroallopregnan-3β-ol-11,20-dione then to the conanine as described in Example 2) and 300 ml. of tetrahydrofuran is prepared and then heated at reflux for two hours. The mixture is then quenched in 30 ml. of water. The metal precipitate is separated and the filtrate is evaporated to leave an oil which is 3β, 11β-dihydroxy-6α-fluoroconanine. This material (3 g.) is reacted with 4.5 g. of methyl bromide in 50 ml. of benzene at reflux for 5 hours. The methobromide separates as a solid and is collected by filtration. The methiodide (2.5 g.) dissolved in methanol (100 ml.) is passed over a column containing IRA-400 resin (hydroxide form). The methanolic eluate is evaporated and the oily residue is heated to 185° C. on an oil bath. After evolution of gas is complete, the residue is recrystallized from methanol to give 11,18-epoxy-6α-fluoro-20-dimethyl-amino-allopregnan-3β-ol. This compound (2 g.) is quaternized by heating with 20 ml. of ethyl bromide in benzene for 2 hours. The resulting solid is the desired ethobromide.

A mixture of 1 g. of the ethobromide in 15 ml. of dimethylacetamide is treated with 1 g. of potassium tert. butoxide and heated to about 150° C. then on the steam bath for one hour. The product is isolated by quenching in water and recrystallizing the solid from methanol, 11,18-epoxy-6α-fluoro-20-allopregnen-3β-ol. The pregnenol (0.68 g.) in 15 ml. of acetone is oxidized with 0.60 ml. of standardized 4 M chromic acid solution. The mixture is poured into water-ethanol and chilled to give the 3-keto compound.

A mixture of 1.8 g. of 11,18-epoxy-6α-fluoro-20-allopregnen-3-one and 2 g. of osmium tetroxide in 200 ml. of absolute dioxane is held at 50° C. for 24 hours. The mixture is filtered. The osmium ether is refluxed in a suspension of 12 g. of sodium sulfite in 150 ml. of aqueous methanol for 6 hours. The filtrate is evaporated to dryness then the residue taken through methylene chloride to give 11,18-epoxy-6α-fluoroallopregnan-20,21-diol-3-one. The diol (1 g.) is acylated with 2 ml. of propionic anhydride in pyridine at room temperature overnight. After quenching the dipropionate ester is obtained.

*Example 5*

A mixture of 12.5 g. of 3α-hydroxy-16α-methyl-11-keto-5β-conanine (our copending application, Serial No. 832,165), 5.8 g. of lithium aluminum hydride in 300 ml. of tetrahydrofuran is heated at reflux for one hour. The 11-hydroxy material is obtained by quenching and evaporating the filtrate. It is then converted to the methiodide, to the hydroxide form, heated and requaternized as in Example 1 to form 11,18-epoxy-16α-methyl-20-dimethylaminopregnan-3α-ol methiodide.

A mixture of 15 g. of this compound, 15 g. of sodium methoxide and 150 ml. of dimethylformamide is reacted as in Example 1 to give 11,18-epoxy-16α-methyl-20-pregnen-3α-ol which (11 g.) is in turn oxidized with chromic acid solution to give the 3-ketone. A mixture of 7.2 g. of this compound, 6 g. of osmium tetroxide and 500 ml. of ether is reacted for 48 hours. The osmium ester is decomposed by refluxing in 500 ml. of aqueous alcohol containing 36 g. of sodium sulfite to give 11,18-epoxy-16α-methylpregnan-20,21-diol-3-one. The diol is acetylated (4.6 g.) with 3 ml. of acetic anhydride in 20 ml. of pyridine to give the 20,21-diacetate.

*Example 6*

A solution of 10 g. of 3β-hydroxy-20-methylamino-allopregnan-11-one in 100 ml. of acetic acid with 3 g. of chromic oxide in 20 ml. of 90% acetic acid is heated at 65° C. for one hour. The cooled solution is quenched in chilled water to give 20-methylaminoallopregnan-3,11-dione. A solution of 8 g. of the dione in 300 ml. of chloroform is treated with 5% sodium hypochlorite solution to give 20-(N-methyl-N-chloroamino)-allopregnan-3,11-dione. A solution of 5 g. of the chloroamine in 75 ml. of trifluoroacetic acid is irradiated with ultraviolet light under nitrogen for one hour. The acid is evaporated in vacuo. The residue is taken up in 100 ml. of methanol, made strongly basic with 25% methanolic potassium hydroxide and heated at reflux for one hour to give 3,11-diketoconanine.

A mixture of 17 g. of 3,11-diketoconanine, 300 ml. of ethylene glycol and 11 g. of p-toluenesulfonic acid is stirred and distilled over a period of two hours at 1.5 mm. pressure with a still head temperature of about 80° C. The reaction mixture is made alkaline with alcoholic potassium hydroxide and poured into water to separate the 3,3-bisethylenedioxy compound. A suspension of 9 g. of this compound in 500 ml. of purified dioxane is treated dropwise with a solution of 15 g. of lithium aluminum hydride in ether. The mixture is then heated at reflux for 30 minutes and quenched with water. The suspension is filtered and the ethereal filtrate evaporated to give the 11β-hydroxy compound which (2 g.) in 100 ml. of methanol and 50 ml. of 50% aqueous acetic acid is refluxed for one hour. The suspension is cooled, neutralized and evaporated. The residue is extracted with chloroform to give 3-keto-11β-hydroxyconanine.

This compound (1.8 g.), 2.5 ml. of ethyl iodide in 25 ml. of benzene is heated at reflux for three hours. The solid ethiodide in methanol is then passed over a resin column (as described in Example 1). The oily residue from the methanol eluates is heated to 185° C. for 15 minutes to give a residue of 11,18-epoxy-20-ethylmethyl-aminoallopregnan-3-one. This compound (1.5 g.) is quaternized with butyl iodide in benzene to give the desired quaternary compound.

The quaternary (1 g.) in 25 ml. of dimethylformamide with 1 g. of lithium hydride is heated over a flame briefly, then on the steam bath for one hour. Quenching in water carefully gives 11,18-epoxy-20-allopregnen-3-one, M.P. 168–169° C.

*Example 7*

A mixture of 8.0 g. of 3α,11β-dihydroxy-6β-methyl-pregnan-20-one and 0.25 g. of platinum oxide in 100 ml. of ethanol and an excess of ethylamine is hydrogenated until the theoretical amount of hydrogen is absorbed. Working up as in Example 3 gives the 20-ethylamino compound which is reacted with hypochlorite solution, irradiated in trifluoroacetic acid and reacted with alkali to give N-ethyl-3α,11β-dihydroxy-6β-methyl-5β-conanine. This compound (2.0 g.) is reacted with ethyl iodide and then passed through an anion exchange resin to form the quaternary hydroxide.

Heating this salt at 200° C. at 100 mm. for 10 minutes gives 11,18-epoxy-6β-methyl-20-diethylaminopregnan-3α-ol. This product is refluxed with excess ethyl bromide for three hours in benzene to give, upon filtration, the quaternary salt.

A mixture of 2.0 g. of 11,18-epoxy-6β-methyl-20-triethylammoniumpregnan-3α-ol bromide, 2.0 g. of sodium ethoxide and 20 ml. of dimethylformamide is heated to reflux, then heated on a steam cone for one hour. Working up as in Example 1 gives 11,18-epoxy-6β-methyl-20-pregnen-3α-ol. Reaction of the 3α-ol with excess acetic anhydride in pyridine at 80° C. then quenching with water gives the 3α-acetoxy derivative.

Example 8

A solution of 5.0 g. of N-butyl-3β,11β-dihydroxy-19-norconanine (prepared as in Example 3) in pyridine-dioxane solution is reacted at room temperature with one molar equivalent of acetic anhydride for 6 hours. Quenching gives the 3-acetate derivative. This compound (4.0 g.) is reacted with methyl iodide (5.0 g.) in benzene at reflux to give the methiodide which is dissolved in methanol and passed over an hydroxide resin column to give the quaternary hydroxide. The quaternary compound is heated to 190° C. at 15 mm. until effervescence ceases to give 3β-acetoxy-20-butylmethylamino-11,18-epoxy-19-norallopregnane. The methiodide is formed by heating with an excess of methyl iodide in benzene for two hours.

A solution of 1.0 g. of the methiodide in 25 ml. of dimethylacetamide is treated with 1.0 g. of sodium methoxide as in Example 1 to give 11,18-epoxy-19-nor-20-allopregnen-3β-ol. This 3β-ol is reacted with excess acetic anhydride in pyridine solution to give 3β-acetoxy-11,18-epoxy-19-nor-20-allopregnene.

Example 9

To a solution of methylamine in 100 ml. of ethanol (10% w./w.) is added 9.3 g. of 3β-acetoxy-5-pregnen-11,20-dione and 0.25 g. of platinum oxide. The mixture is then hydrogenated until one mole of hydrogen is absorbed. The catalyst is filtered off and the solvent evaporated. The residue is taken up in dilute hydrochloric acid, the acid solution made basic and then extracted with chloroform. By removing the chloroform in vacuo and recrystallization of the residue, 3β-acetoxy-20α-methylamino-5-pregnen-11-one is obtained which is hydrolyzed by refluxing in methanolic potassium hydroxide to the 3-hydroxy derivative.

A solution of 5.0 g. of 3β-hydroxy-20α-methylamino-5-pregnen-11-one in 250 ml. of toluene and 100 ml. of cyclohexanone is oxidized with 15.0 g. of aluminum isopropoxide by heating at reflux for two hours to give 3,11-diketo-20-methylamino-4-pregnene. The amine (6.0 g.) is treated with 5% sodium hypochlorite solution to give 3,11-diketo-20-(N-methyl - N - chloroamino)-4-pregnene which is dissolved in 75 ml. of trifluoroacetic acid and irradiated with ultarviolet light for 40 minutes. Alkali treatment of the resulting 3,11-diketo-18-chloro-20-methylamino-4-pregnene yields 3,11-diketo-Δ⁴-conanine.

This 3,11-diketo-Δ⁴-conanine is reacted with excess ethylene glycol and p-toluenesulfonic acid as in Example 6 to give the 3,3-bisethylenedioxy compound. A suspension of this compound (5.0 g.) in 300 ml. of purified dioxane is treated dropwise with a solution of 8.0 g. of lithium aluminum hydride in ether. Refluxing for 30 minutes and working up as in Example 6 gives 3-keto-11β-hydroxy-Δ⁴-conanine.

This conanine is refluxed with excess methyl iodide in benzene for two hours. Dilution with ether and filtration gives 3-keto-11β-hydroxy-Δ⁴-conanine methiodide.

A methanol solution of the methiodide is passed through the hydroxide form of IRA-400 resin. Evaporating the methanolic eluate and heating the residue at 150° C. gives a crude product which is refluxed with excess methyl iodide in benzene for 90 minutes to give, upon filtration, 11,18-epoxy-20-dimethylamino-Δ⁴-pregnen-3-one methiodide.

A mixture of 5.0 g. of this methiodide, 5.0 g. of sodium methoxide and 50 ml. of dimethylformamide is refluxed for 10 minutes, then heated on a stream bath for one hour. Working up as in Example 1 gives 11,18-epoxy-Δ⁴,²⁰-pregnadien-3-one.

Example 10

A mixture of 5.0 g. of 3α,11β-dihydroxy-6β-methylpregnane-20-one in 300 ml. of chloroform and 0.5 ml. of alcohol is cooled to −10° C. Anhydrous hydrochloric acid is bubbled through the mixture for two hours keeping the temperature at about −10° C. The mixture is washed with dilute sodium bicarbonate, dried over anhydrous sodium sulfate and evaporated in vacuo. The residue is recrystallized from acetone-hexane to give 3α,11β-dihydroxy-6α-methylpregnane-20-one.

A mixture of the above prepared compound, methylamine and platinum oxide is hydrogenated to give the 20-methylamino compound which is reacted with hypochlorite solution, irradiated in trifluoroacetic acid and treated with alkali to give 3α,11β-dihydroxy-6α-methyl-5β-conanine.

This conanine is reacted with methyl iodide and the resulting methiodide is passed through an anion exchange resin to give the quaternary hydroxide.

Heating this hydroxide at 170° C. (50 mm.) until the effervescence ceases gives 11,18-epoxy-6α-methyl-20-dimethylaminopregnan-3α-ol. Refluxing with excess methyl iodide in benzene solution for two hours separates the methiodide salt which is reacted with sodium hydride in dimethylformafide solution to give 11,18-epoxy-6α-methyl-20-pregnen-3α-ol.

Example 11

To 7.2 g. of 5α-hydroxy-6β-methyl-3,11,20-allopregnantrione in 100 ml. of methanol is added 0.4 g. of sodium borohydride dissolved in pyridine. After 10 minutes an excess of dilute hydrochloric acid is added and the mixture extracted with methylene chloride. Evaporation of the solvent and chromatography of the residue over alumina yields 3β,5α-dihydroxy-6β-methyl-11,20-allopregnandione.

The dione prepared as above (18.0 g.) and 0.5 g. of platinum oxide are added to 200 ml. of ethanol containing 10% w./w. of methylamine and the mixture hydrogenated until one mole of hydrogen is absorbed. The catalyst is removed by filtration and the filtrate evaporated to dryness. The residue is taken up in chloroform and extracted with 5% acetic acid. Basifying the acid extract yields 3β,5α-dihydroxy - 6β - methyl-20α-methylaminoallopregnan-11-one.

A solution of 7.6 g. of the amine in 500 ml. of anhydrous toluene and 100 ml. of cyclohexanone is heated at reflux and a solution of 25.0 g. of aluminum isopropoxide in 100 ml. of toluene is added dropwise with stirring. Refluxing is continued for two hours, 10 ml. of glacial acetic acid is added and the mixture steam distilled. Working up yields 3,11-diketo-6β-methyl-20-methylamino-4-pregnene.

A solution of 6.0 g. of 3,11-diketo-6β-methyl-20-methylamino-4-pregnene in 300 ml. of chloroform is stirred with 300 ml. of 5% sodium hypochlorite solution for one hour. The hypochlorite is removed and the treatment repeated. The chloroform layer is separated, washed with water, dried and evaporated to give 3,11-diketo-6β-methyl-20-(N-methyl-N-chloroamino)-4-pregnene.

The above N-chloroamine (6.6 g.) is dissolved in 65 ml. of redistilled trifluoroacetic acid and irradiated with ultraviolet light under nitrogen for 40 minutes. The trifluoroacetic acid is evaporated in vacuo and the residual 18 - chloro-3,11-diketo-6β-methyl-20-methylamino-4-pregnene is dissolved in 75 ml. of methanol, made strongly basic with 25% methanolic potassium hydroxide. The solution is refluxed for one hour, concentrated in vacuo, poured into 500 ml. of water and extracted with chloroform. The chloroform extract is washed, dried and evaporated. The residue is boiled for two hours with 12.5 ml. of acetic anhydride, poured into 250 ml. of water and filtered. The filtrate is adjusted to pH 11 and extracted with chloroform. The extract is washed, dried and evaporated to give 3,11-diketo-6β-methyl-Δ⁴-conanine.

As in Example 6 the above prepared compound is converted to its 3,3-bisethylenedioxy derivative which is reduced with lithium aluminum hydride in ether to give 3-keto-11β-hydroxy-6β-methyl-Δ⁴-conanine.

This conanine is refluxed with methyl iodide; the resulting methiodide is passed throught an anion exchange resin to give the quaternary hydroxide which is heated at 180° C. until the effervescence ceases; the product is refluxed with excess methyl iodide to separate 11,18-epoxy-6β-methyl-20-dimethylamino-Δ⁴- pregnen-3-one methiodide.

Refluxing 2.0 g. of the above prepared methiodide with 2.0 g. of sodium methoxide in 25 ml. of dimethylacetamide for 15 minutes, pouring the reaction mixture into water, cooling, filtering and recrystallizing from methanol gives 11,18-epoxy-6β-methyl-Δ⁴,²⁰-pregnadien-3-one.

This epoxypregnadienone is oxidized by treating with osmium tetroxide in ether solution as in Example 1 to give 11,18-epoxy-6β-methyl-Δ⁴-pregnen-20,21-diol-3-one. The corresponding 20,21-diacetoxy compound is prepared by heating the diol with acetic anhydride in pyridine solution.

Example 12

A solution of 5 g. of 3β-acetoxy-9(11)-allopregnen-20-one [J. Org. Chem. 16, 1278 (1951)] in 500 ml. of dioxane and 75 ml. of water is treated with N-bromoacetamide and 77 ml. of 1.5% aqueous perchloric acid. After 20 minutes at 27° C., the excess N-bromoacetamide is destroyed with aqueous sodium pysosulfite. The pH is adjusted to 11. The resulting solution is allowed to stand for 30 minutes, then acidified with glacial acetic acid and evaporated in vacuo. When the dioxane is off the reaction mixture, the residue is diluted with water. The crude product is collected and acetylated with pyridine and acetic anhydride at 100° C. The cooled mixture is poured into water. The solid is collected and recrystallized to give 3β-acetoxy-9β,11β-epoxyallopregnan-20-one. This compound (5 g.) in 500 ml. of chloroform and 25 ml. of ethanol is mixed with 6 g. of anhydrous hydrogen fluoride. After standing at ambient temperature for 6 hours, the reaction mixture is poured into 5% sodium bicarbonate. The product is extracted into chloroform to give 3β-acetoxy-9α-fluoroallopregnan-11β-ol-20-one. This compound (3 g.) in 100 ml. of acetic acid is oxidized with 1 g. of chromic acid for 1 hour at 27° C. The solution is quenched and extracted with chloroform to give the 11-one. This compound (2.8 g.) in 75 ml. of ethanol containing 10% w./w. of methylamine is shaken under hydrogen with 200 mg. of platinum oxide until the theoretical amount of hydrogen is absorbed. The mixture is diluted with ethanol, filtered and the filtrate evaporated to leave the 20-methylamino compound. This compoud (13 g.) in 200 ml. of chloroform is stirred with 300 ml. of 5% sodium hypochlorite solution for 30 minutes. The chloroform layer is separated, washed and evaporated to leave 3β - acetoxy - 9α - fluoro - 20α - methylchloroaminoallopregnan-11β-one. The chloramine (8.4 g.) is dissolved in 80 ml. of trifluoroacetic acid and irradiated for 45 minutes. The solvent is evaporated and the residue taken up in methanol, made basic and heated at reflux for six hours. The chloroform extracted residue is taken to dryness to give 3β-hydroxy-11-keto-9α-fluoroconanine. This material (6 g.) is reduced with lithium aluminum hydride in the tetrahydrofuran as described above to give the 11-ol. The conanine (3 g.) is reacted with 2 ml. of methyl iodide in 300 ml. of benzene at reflux for three hours. The resulting methiodide in methanol is passed over an Amberlite IRA-44 column (hydroxide form, copending application, Serial No. 832,165). The residue from the methanolic eluates is heated at 190° C. at 25 minutes until gas formation stops to give 11,18-epoxy-9α-fluoro-20-dimethylaminoallopregnan-3β-ol. This compound (1 g.) is quaternized with methyl iodide in acetonitrile.

The quaternary salt (5 g.) is treated with 5 g. of sodium methoxide in 50 ml. of dimethylformamide as in Example 1 to give 9α-fluoro-11,18-epoxy-20-allopregnen-3β-ol.

Example 13

Substituting 6α-fluoro-19-nor-allopregnan-3β-ol-11,20-dione (prepared as described in U.S. Patent #2,838,492) in the amination and cyclization reactions of Example 3 gives 6α-fluoro-19-nor-3β-hydroxy-11-ketoconanine. Reduction of this compound with lithium aluminum hydride yields the 11β-hydroxyconanine. This conanine is refluxed with excess methyl iodide in benzene to give the quaternary salt which is dissolved in methanol and passed over a hydroxide resin as in Example 1. Heating the quaternary hydroxide at 185° C. (15 mm.) until effervescence ceases gives 11,18-epoxy-6α-fluoro-20-dimethylamino-19-nor-allopregnan-3β-ol.

The above prepared amino compound is converted to the methiodide by refluxing with methyl iodide in acetonitrile for 3 hours.

A mixture of 4.0 g. of the methiodide, 4.0 g. of potassium methiodide and 40 ml. of dimethylformamide is heated to reflux, then on a steam bath for two hours to give 11,18-epoxy-6α-fluoro-19-nor-allopregnen-3β-ol.

What is claimed is:

1. The method of preparing 11,18-epoxy-20-dialkylamino steroids selected from the group consisting of:

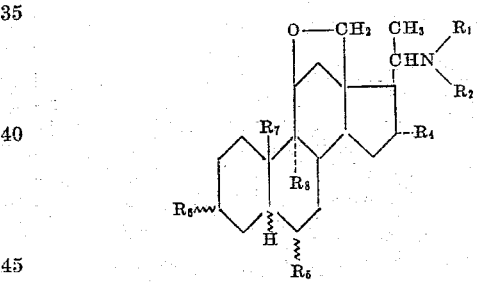

and

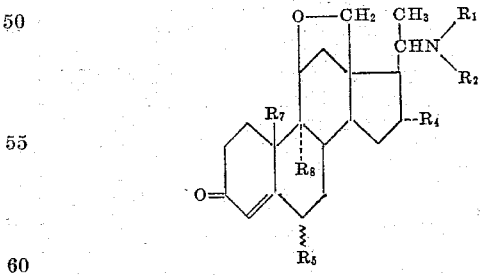

in which $R_1$ and $R_2$ are lower alkyl having 1–4 carbon atoms; $R_4$ is a member selected from the group consisting of hydrogen and methyl; $R_5$ is a member selected from the group consisting of hydrogen, fluoro and methyl; $R_6$ is a member selected from the group consisting of hydroxyl, acetoxy and, when taken together with the carbon atom to which it is attached, keto; $R_7$ is a member selected from the group consisting of hydrogen and methyl; $R_8$ is a member selected from the group consisting of hydrogen and fluoro and ⸱ is a configurational position selected from the group consisting of α and β, which comprises heating a quaternary hydroxide derivative of a conanine selected from the group consisting of:

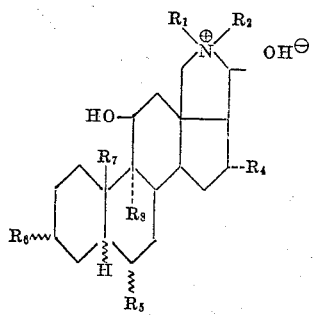

and

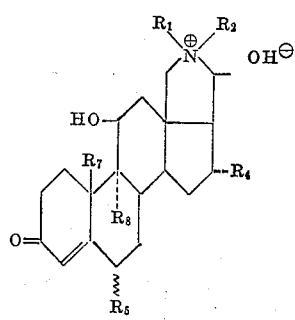

in which $R_{1-2}$, $R_{4-8}$ and ⅔ are as defined hereabove.

2. The method of preparing 11,18-epoxy-20-pregnenes selected from the group consisting of:

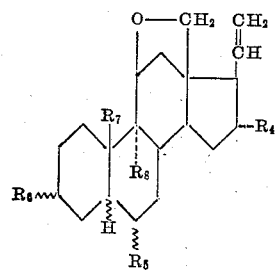

and

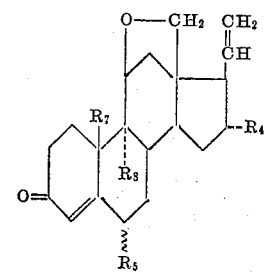

in which $R_4$ is a member selected from the group consisting of hydrogen and methyl; $R_5$ is a member selected from the group consisting of hydrogen, fluoro and methyl; $R_6$ is a member selected from the group consisting of hydroxyl, acetoxy and, when taken together with the carbon to which it is attached, keto; $R_7$ is a member selected from the group consisting of hydrogen and methyl; $R_8$ is a member selected from the group consisting of hydrogen and fluoro and ⅔ is a configurational position selected from the group consisting of α and β, which comprises heating a quaternary hydroxide derivative of a conanine selected from the group consisting of:

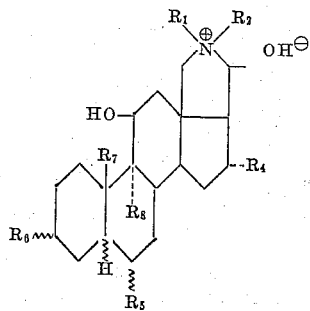

and

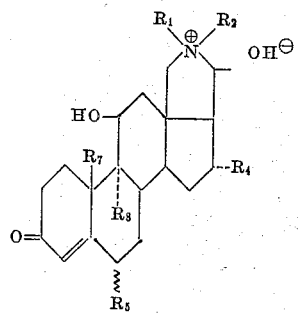

in which $R_1$ and $R_2$ are lower alkyl having 1–4 carbon atoms and $R_{4-8}$ and ⅔ are as defined hereabove to form an 11,18-epoxy-20-dialkylamino steroid selected from the group consisting of:

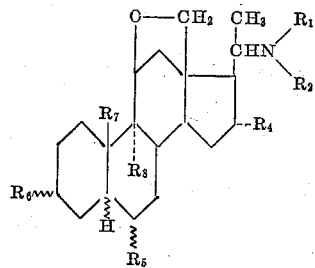

and

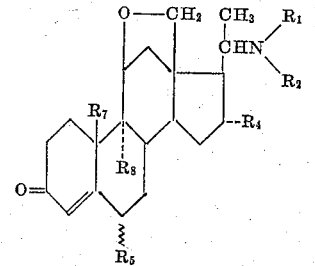

in which $R_{1-2}$, $R_{4-8}$ and ⅔ are as defined hereabove; reacting said 11,18-epoxy-20-dialkylamino steroid with a reactive lower alkyl halide having 1–4 carbon atoms to form an 11,18-epoxy-20-trialkylammonium steroid selected from the group consisting of:

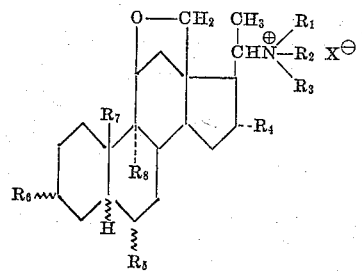

and

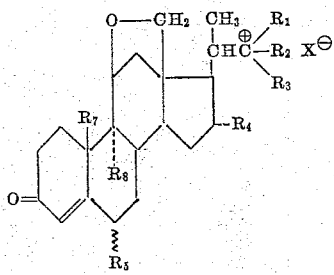

in which $R_3$ is lower alkyl having 1–4 carbon atoms; X is a member selected from the group consisting of halide, methosulfate, sulfate and p-toluene sulfonate; $R_{1-2}$, $R_{4-8}$ and $\}$ are as defined hereabove; and reacting said 11,18-epoxy-20-trialkylammonium steroid with an inorganic strongly basic reagent selected from the group consisting of an alkali metal lower alkoxide, an alkali metal amide; an alkali metal hydride and an alkali metal hydroxide in a polar organic solvent in which the reactants are substantially soluble, which is not reactive with the reactants and which is strongly ionizing.

3. A chemical compound of the class consisting of a free base and its lower alkyl quaternary ammonium salts, the free base being selected from the group consisting of compounds having the following structural formulas:

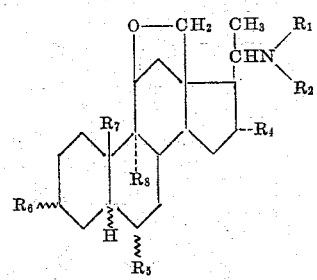

and

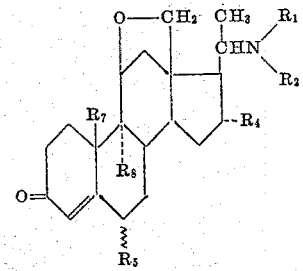

in which $R_1$ and $R_2$ are lower alkyl having 1–4 carbon atoms; $R_4$ is a member selected from the group consisting of hydrogen and methyl; $R_5$ is a member selected from the group consisting of hydrogen, fluoro and methyl; $R_6$ is a member selected from the group consisting of hydroxyl, acetoxy and, when taken together with the carbon atom to which it is attached, keto; $R_7$ is a member selected from the group consisting of hydrogen and methyl; $R_8$ is a member selected from the group consisting of hydrogen and fluoro and $\}$ is a configurational position selected from the group consisting of α and β.

4. A chemical compound having the following structural formula:

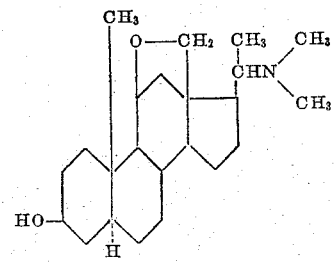

5. A chemical compound having the following structural formula:

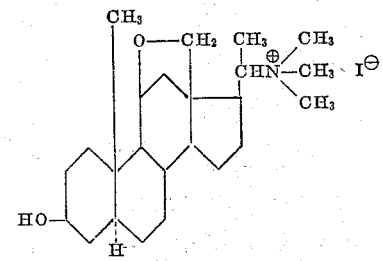

6. A chemical compound having the following structural formula:

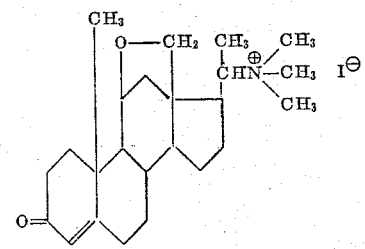

7. A chemical compound having the following structural formula:

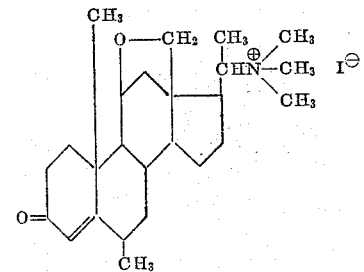

8. A chemical compound having the following structural formula:

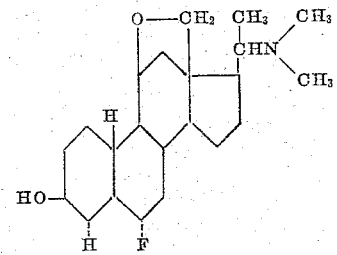

No references cited.